US010332043B2

(12) United States Patent
Nair et al.

(10) Patent No.: US 10,332,043 B2
(45) Date of Patent: Jun. 25, 2019

(54) SYSTEM AND APPROACH FOR SETTING FORTH A PHYSICAL VIEW AND A NETWORK VIEW OF A JOB

(71) Applicant: Honeywell International Inc., Morristown, NJ (US)

(72) Inventors: Ajay Nair, Bangalore (IN); Wei Hua, Acton, MA (US); Liwen Yu, Acton, MA (US); Christopher Martin, Sterling, MA (US); Upender Paravastu, Bangalore (IN); James Barrette, Ashburnham, MA (US); Prabhat Ranjan, Bangalore (IN); Robert Klamka, Westford, MA (US)

(73) Assignee: Honeywell International Inc., Morris Plains, NJ (US)

( * ) Notice: Subject to any disclaimer, the term of this patent is extended or adjusted under 35 U.S.C. 154(b) by 1227 days.

(21) Appl. No.: 14/169,071

(22) Filed: Jan. 30, 2014

(65) Prior Publication Data
US 2015/0213379 A1    Jul. 30, 2015

(51) Int. Cl.
*G06Q 10/06*    (2012.01)
(52) U.S. Cl.
CPC ................... *G06Q 10/06* (2013.01)
(58) Field of Classification Search
CPC .... G05B 2219/2641; G05B 2219/2642; G06Q 10/06; H04N 21/43615; H04L 12/2803; H04L 12/2825
USPC ........................................................ 703/21
See application file for complete search history.

(56) References Cited

U.S. PATENT DOCUMENTS

| 7,295,116 | B2 | 11/2007 | Kumar et al. |
| 8,099,178 | B2 | 1/2012 | Mairs et al. |
| 8,151,280 | B2 | 4/2012 | Sather et al. |
| 8,176,095 | B2 | 5/2012 | Murray et al. |
| 8,219,660 | B2 | 7/2012 | McCoy et al. |
| 8,271,941 | B2 | 9/2012 | Zhang et al. |
| 8,302,020 | B2 | 10/2012 | Louch et al. |
| 8,375,118 | B2 | 2/2013 | Hao et al. |
| 8,516,016 | B2 | 8/2013 | Park et al. |
| 8,869,027 | B2 | 10/2014 | Louch et al. |

(Continued)

FOREIGN PATENT DOCUMENTS

| WO | WO 2009/012319 | 1/2009 |
| WO | WO 2013/062725 | 5/2013 |

OTHER PUBLICATIONS

Info@hand, CRBM System 7.0 User Guide, Version 7.0, Nov. 2012, 1CRM Corp. 1-259.*
"4.0 Today's Activities, The Home Dashboard," CRBM info@hand website, 46 pages, prior to Apr. 25, 2013.
"Free Facilities Dashboards," eSight Energy Website, 2 pages, prior to Apr. 25, 2013.

(Continued)

*Primary Examiner* — Rehana Perveen
*Assistant Examiner* — Justin C Mikowski
(74) *Attorney, Agent, or Firm* — Seager, Tufte & Wickhem LLP

(57) ABSTRACT

An approach for managing a job that may provide a logical model of one or more structures as a configuration for deployment to, for instance, one or more site controllers. A job may be newly created, an existing job, or a remote job. A portal may be established for connection to a relevant job station. A physical view and a network node may be established for showing the physical and network views. The relevant job station may incorporate configurations that support a workbench, a dashboard and gadgets.

8 Claims, 17 Drawing Sheets

(56) References Cited

U.S. PATENT DOCUMENTS

| | | | |
|---|---|---|---|
| 2005/0119767 A1 | 6/2005 | Kiwimagi et al. | |
| 2008/0222565 A1 | 9/2008 | Taylor et al. | |
| 2009/0254906 A1* | 10/2009 | Zhang | G06Q 10/06 718/101 |
| 2009/0322782 A1 | 12/2009 | Kimchi et al. | |
| 2010/0058248 A1 | 3/2010 | Park | |
| 2010/0106543 A1* | 4/2010 | Marti | G06Q 10/063 705/7.11 |
| 2010/0286937 A1 | 11/2010 | Hedley et al. | |
| 2010/0299165 A1* | 11/2010 | Chen | G06Q 10/06393 705/7.39 |
| 2010/0318200 A1 | 12/2010 | Foslien et al. | |
| 2011/0083077 A1* | 4/2011 | Nair | G06Q 10/06 715/735 |
| 2011/0087988 A1 | 4/2011 | Ray et al. | |
| 2011/0225580 A1* | 9/2011 | Nair | G06F 9/44505 717/178 |
| 2012/0065944 A1* | 3/2012 | Nielsen | G06Q 10/103 703/1 |
| 2012/0066019 A1* | 3/2012 | Hinshaw | G06Q 10/06 705/7.23 |
| 2012/0259466 A1 | 10/2012 | Ray et al. | |
| 2012/0291068 A1 | 11/2012 | Khushoo et al. | |
| 2013/0067017 A1* | 3/2013 | Carriere | G06Q 10/06 709/208 |
| 2013/0289774 A1 | 10/2013 | Day et al. | |
| 2013/0318519 A1* | 11/2013 | Coolidge | G06F 8/65 717/173 |
| 2014/0067131 A1* | 3/2014 | Park | A47L 15/4293 700/275 |
| 2014/0162684 A1* | 6/2014 | Shaw | H04W 4/02 455/456.1 |
| 2015/0112989 A1* | 4/2015 | Marti | G06Q 10/06 707/737 |

OTHER PUBLICATIONS

Alerton Building Controls, Gallery Prints, 7 pages, Dec. 19, 2013.
Carter, "Industrial Energy Management Dashboards Require a Toolkit," Cross Automation, 11 pages, Nov. 4, 2013.
U.S. Appl. No. 14/109,496, filed Dec. 17, 2013.
U.S. Appl. No. 14/163,850, filed Jan. 24, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
e-homecontrols.com, "e-Home Controls Website," link to actual website no longer works, 1 page, prior to Dec. 19, 2013.
http://www.ccbac.com, "C&C (/)—Omniboard," 5 pages, Dec. 19, 2013.
http://www.domcontroller.com/en/, "DomController Home Automation Software—Control Anything from Anywhere," 11 pages, printed Jan. 6, 2015.
http://www.novar.com/ems-bas/opus-building-automation-system, "Novar OPUS BAS," 1 page, prior to Feb. 13, 2013.
Instituto Superior Tecnico, "A 3D Interactive Environment for Automated Building Control," Master's Dissertation, 120 pages, Nov. 2012.
Panduit Corp., "Enable a Building Automation with Panduit Enterprise Solutions," 4 pages, Nov. 2012.
Preuveneers et al., "Intelligent Widgets for Intuitive Interaction and Coordination in Smart Home Environments," IEEE Proceedings of Eighth International Conference on Intelligent Environments, pp. 157-164, 2012.
Wu et al., "A Web 2.0-Based Scientific Application Framework," 7 pages, prior to Jan. 30, 2014.
www.geappliances.com/home-energy-manager/about-energy-monitors.htm, "Energy Monitor, Home Energy Monitors, GE Nucleus," 2 pages, printed Jan. 15, 2013.
www.luciddesigngroup.comnetwork/apps.php#homepage, "Lucid Building Dashboard Network—Apps," 9 pages, printed Jan. 15, 2013.

* cited by examiner

FIGURE 3

| Name | Description | Edit? | Value Properties | Note |
|---|---|---|---|---|
| Select MicroServer BOG File | | | | |
| BOG File Name | The full file path of MicroServer bog file. It can be populated by using Explore command | Yes | | |
| Determine how to build Entity Hierarchy (three radio buttons) | | | | |
| Only import devices | Only phoenix devices will be imported, and put into "AnassignedDevices" folder. | N/A | | Default choice |
| Import devices and rooms | Only rooms | N/A | | Disabled |
| Import all nodes | Import all LON nodes (incl. subsystems). All non-device nodes are imported as generic Entities. | | | |
| Left | Describe the current selected choice | | Update the text when user selects different import option. | |
| Command Buttons | | | | |
| Explore | Launch file open dialog box to select a MicroServer BOG file (*.bog) | | | |
| OK | Launch the import process on the selected bog file | | | |
| Cancel | Cancel the importing process. | | | |

FIGURE 8

```xml
<OMSystem version="0.0.1">
  <Devices>
    <Device name="SRV200_10" inst="10" model="SRV200">
      <BacnetDevCfg tcpip="false" networkID="1" bindPort="2" udpport="" vendorID="26" ModelName="Phoenix Controls MicroServer" />
      <UnmappedPoints />
    </Device>
  </Devices>
  <CMTree>
    <Entity name="SRV200_10" src="SRV200_10" type="Generic">
      <Entity name="Subsystem1" type="Generic" subtype="">
        <Entity name="CmptLab" type="Generic" subtype="">
          <Entity name="HoodSys" type="Generic" subtype="">
            <Entity name="HOODMain" type="Device" model="Lvc_Hood" dev="SRV200_10">
            </Entity>
            <Entity name="MAVLabCmpt" type="Generic" subtype="" />
          </Entity>
          <Entity name="FullLab" type="Generic" subtype="">
            <Entity name="BYPASS" type="Generic" subtype="">
              <Entity name="BYPASSMain" type="Device" model="Lvc_Bypass" nvName="nvoAlarmStatus" nvElement="BitsJamAlarm" />
                <Point vFPT="BL_ALARM_JAM" objType="PBBI" objID="12108" objName="BYPASSMain_JAM_ALARM" unit="" bacOrd="h:c91" nvName="nvoAlarmStatus" nvElement="BitsFlowAlarm" />
                <Point vFPT="AL_ALARM_FLOW" objType="PBBI" objID="12109" objName="BYPASSMain_FLOW_ALARM" unit="" bacOrd="h:c92" nvName="nvoEffFlowSetpt" nvElement="flow" />
                <Point vFPT="AL_FLOW_SP_VLV" objType="PBAI" objID="12100" objName="BYPASSMain_EFF_FLOW_CMD" unit="cfm" bacOrd="h:c93" nvName="nvoFlow" nvElement="flow" />
                <Point vFPT="AL_FLOW_VLV" objType="PBAI" objID="12101" objName="BYPASSMain_VLV_FLOW_FDBK" unit="cfm" bacOrd="h:c94" nvName="nvoFlow" nvElement="flow" />
            </Entity>
          </Entity>
          <Entity name="GEX" type="Generic" subtype="" />
          <Entity name="GEXLabFull" type="Generic" subtype="" />
          <Entity name="HOOD1" type="Generic" subtype="" />
          <Entity name="HOOD2" type="Generic" subtype="" />
          <Entity name="HOOD3" type="Generic" subtype="" />
          <Entity name="HOOD4" type="Generic" subtype="" />
          <Entity name="MAV1" type="Generic" subtype="" />
          <Entity name="MAV2" type="Generic" subtype="" />
          <Entity name="MAV3" type="Generic" subtype="" />
          <Entity name="TrackingPair" type="Generic" subtype="" />
          <Entity name="MAV4$28avTrac$29" type="Generic" subtype="" />
          <Entity name="PocSubZone" type="Generic" subtype="" />
        </Entity>
        <Entity name="TraccelRoom" type="Generic" subtype="" />
      </Entity>
    </Entity>
  </CMTree>
</OMSystem>
```

FIGURE 15

| File Name | Description | In JACE? |
|---|---|---|
| DeviceModelList.xml | Contains the full list of Phoenix devices that are supported, and the mappings among Vantage Model names, Macroserver model names and MicroServer names | No |
| VFPTlist.xml | Contains the list of supported VFPT point types. | Yes |
| OMPtMap.bog | Contains the list of supported devices and VFPT BControlPoints. | No. |
| DeviceTemplate/xxxx.vpm | Contains the device's map files (*/.vpm). | No |
| GlobalPreferences.xml | Specifies the default station and job configuration settings. | No |
| JobPreferences.xml | The preferences of a single job. | Yes |

FIGURE 17

SYSTEM AND APPROACH FOR SETTING FORTH A PHYSICAL VIEW AND A NETWORK VIEW OF A JOB

BACKGROUND

The present disclosure pertains to developing site configurations, and particularly to developing configurations for sites with multiple devices.

SUMMARY

The disclosure reveals an approach for managing a job that may provide a logical model of one or more structures as a configuration for deployment to, for instance, one or more site controllers. A job may be newly created, an existing job, or a remote job. A portal may be established for connection to a relevant job station. A physical view and a network node may be established for showing the physical and network views. The relevant job station may incorporate configurations that support a workbench, a dashboard and gadgets.

BRIEF DESCRIPTION OF THE DRAWING

FIG. 3 is a diagram of a screen where further a configuration of units may be selected;

FIG. 8 is a diagram of a table of graphical user interface elements of a convert analog dialog box;

FIG. 15 is a diagram of a data structure of an object structure;

FIG. 17 is a table of listed map files.

DESCRIPTION

Figure 1:
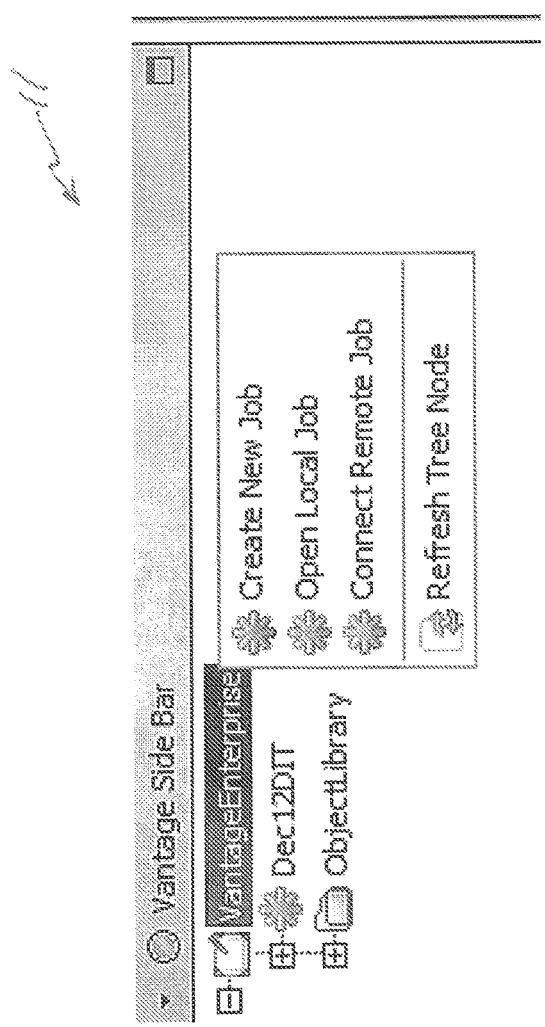
FIG. 1 is diagram of a screen of an enterprise side bar where a selection to create new job, may open a local job or connect a remote job may be made.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present disclosure may set forth systems and approaches for separating logical and device network view and providing a way to map a logical building entity model to the device network hierarchy. A Tridium™ Niagara™ AX framework may be the base software application to develop the site configuration. In a Niagara AX, a site may be setup and viewed using a series of Niagara stations. For a building technician, this network view may become very complex for sites with multiple devices. A more intuitive approach may be a better way to manage the site by providing a logical model of a building. This feature may capture improvements made to an existing Niagara workbench user interface application to provide the customer a desired user experience in creating and deploying job configurations to the site controllers. This feature may also help the personal computer (PC) technician to reduce commissioning time and an initial startup of the job, i.e., an object which may have virtually all of the needed site configurations done for the customer.

The present approach may construct and organize a site based on its logical entities which can be independent of a physical device location. A new application may provide the user an ability to create a logical, hierarchical structure representing the user's business and a site deployment structure using the job manager.

User steps may describe how the new application may resolve the issue where a network view becomes very complex for sites with multiple sub-sites. The user may perform the steps. First, a Vantage™ enterprise root node may be used to create a new job. Second, the internal units and currency may be selected to be used for the job.

A new job (Niagara station) may be created by using a Phoenix base line station. A Vantage system node may be created under the job, which is the logical entity hierarchy tree root node of the job. A single object model (OM) hierarchy may be created under the Vantage system (BVantage). A name of the top node may be the same as that of BACnet devices (e.g., e:SRV200_20301). The entities may be nothing but logical objects, through which other objects (algorithms, devices, dashboards and gadgets) are organized.

An object may have the following child components. a) Calculated points may be a dedicated folder that holds virtually all algorithms, generic wiresheets, and calculated points. b) Dashboards may be in a dedicated folder that holds virtually all of the dashboards provided by Waterfall™ that are associated with the entity. c) Child entities may be nodes which can be rooms/devices.

A third step may be to select a Vantage system (e.g., Phoenix™ system) and use the right click menu option to import all the BACnet points from a microserver or macroserver. The microserver may be a Phoenix Controls™ application designed for small to medium small scale projects in a small system. The microserver may pass data up to 35 devices (i.e., a maximum of 350 BACnet points) to the building management system (BMS) from LON™. Each microserver in a system may represent a group of Phoenix controllers, such as valve controllers, room controllers and programmable control modules (PCMs). A microserver may have the BACnet points in a bog file. A macroserver may also have a BACnet map file (in XML format) that defines how LonWorks™ devices/points are mapped into BACnet devices/objects in the macroserver.

A fourth step may be logical entities that get created (room/hood/device). Fifth, a user may add new/customized entities (device/room) and dashboards from the object library. The library may be customized for a related market segment.

Sixth, on an import of a microserver/macroserver, a default dashboard may be created for each entity with and all points added to the station.

Seventh, the user may create a new dashboard or use an existing dashboard to create new gadgets. Eighth, a configuration may be done on the gadgets to be associated with valid points for each entity.

Ninth, the new job may be downloaded to the site. Tenth, a user may connect to the live site and see the job deployed.

The present approach may be implemented as part of a Phoenix Controls workbench. This means that the base Niagara workbench may be used as a basis and then be extended to provide the desired user features that are needed. The Niagara framework may provide a public application programming interface (API) to allow many of the manual operations to be initiated programmatically. To implement the present approach, the application may consolidate calls to these API's into sequences and will be initiated by simple and intuitive menu options.

A PC technician may create a new job by logging in the Vantage workbench profile. Virtually all jobs may be created inside a local job folder under a Vantage folder inside a Niagara home. A Vantage portal may be created within the Vantage enterprise node which would be establishing a connection to a local job station. A physical view and network node may also be created to show the physical and network views accordingly. The physical view may start with the Vantage system and a corresponding object model. A network view may have the Vantage station.

Each time a new job is created, the creation may stop all the running stations, create a new job station—with all configurations needed to support the workbench and dashboard configurator, user configuration, and so on, and then start the station with a port 1911.

The Vantage enterprise may be a root for virtually all types of navigation including creating a new job, opening an existing job, or connecting to a remote job.

Figure 2:
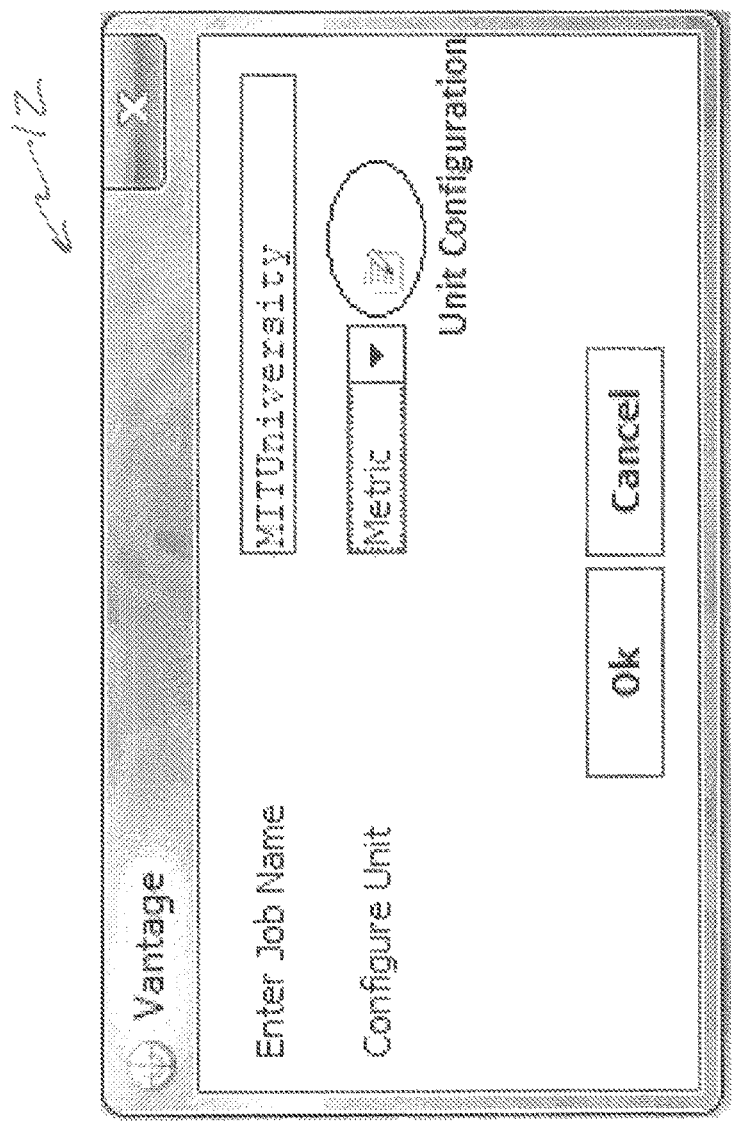
FIG. 2 is a diagram of a screen where a job name may be entered and a unit configuration selected.
Figure 3:
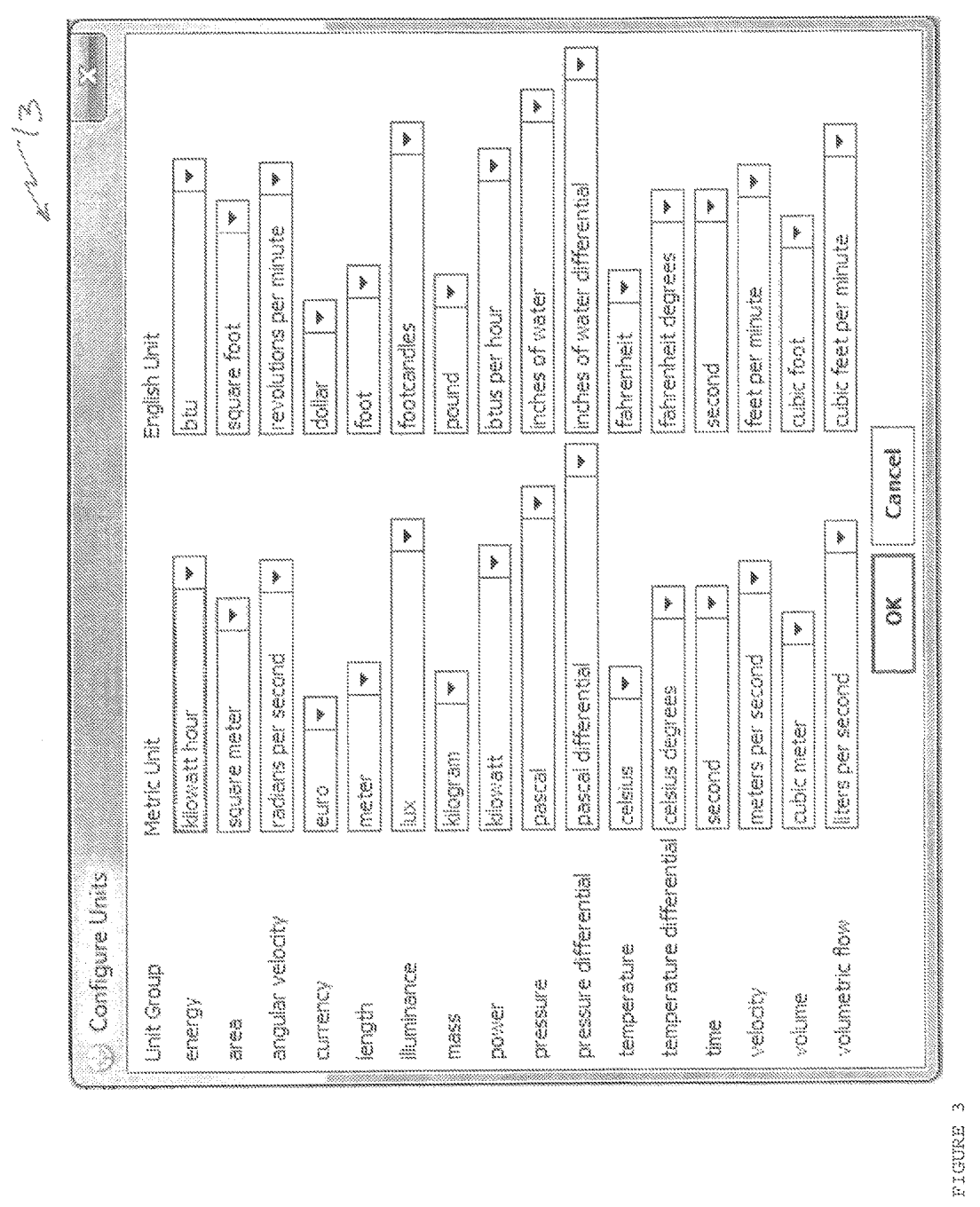

FIG. 1 is diagram of a screen 11 of a Vantage side bar where a selection to create new job, may open a local job or connect a remote job may be made. FIG. 2 is a diagram of a screen 12 where a job name may be entered and a unit configuration selected. FIG. 3 is a diagram of a screen 13 where further configuration of units may be selected. Screen 13 may be regarded as a job manager window.

Figure 4:
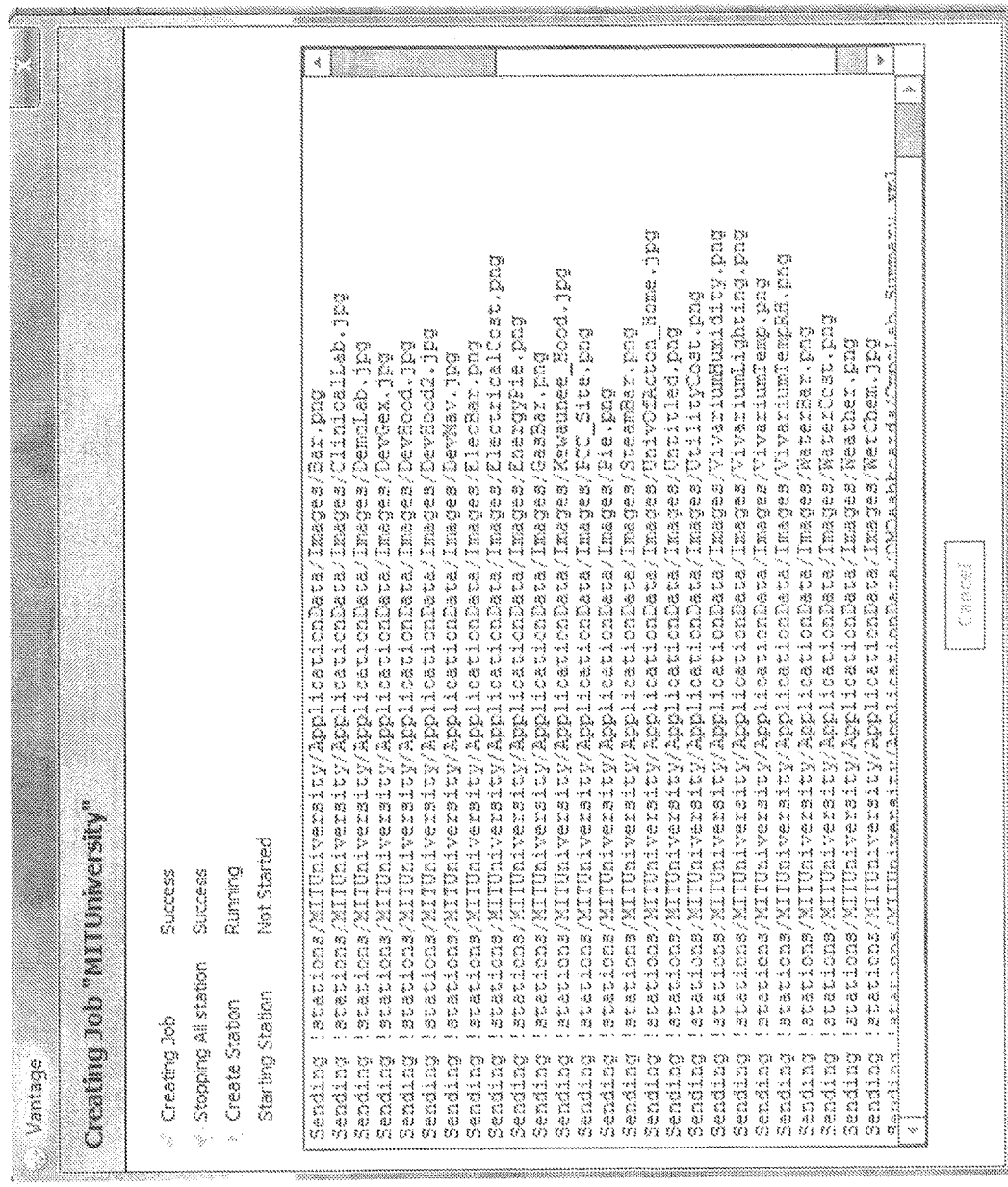
FIG. 4 is a diagram of a screen that shows a new job having been created.
Figure 5:
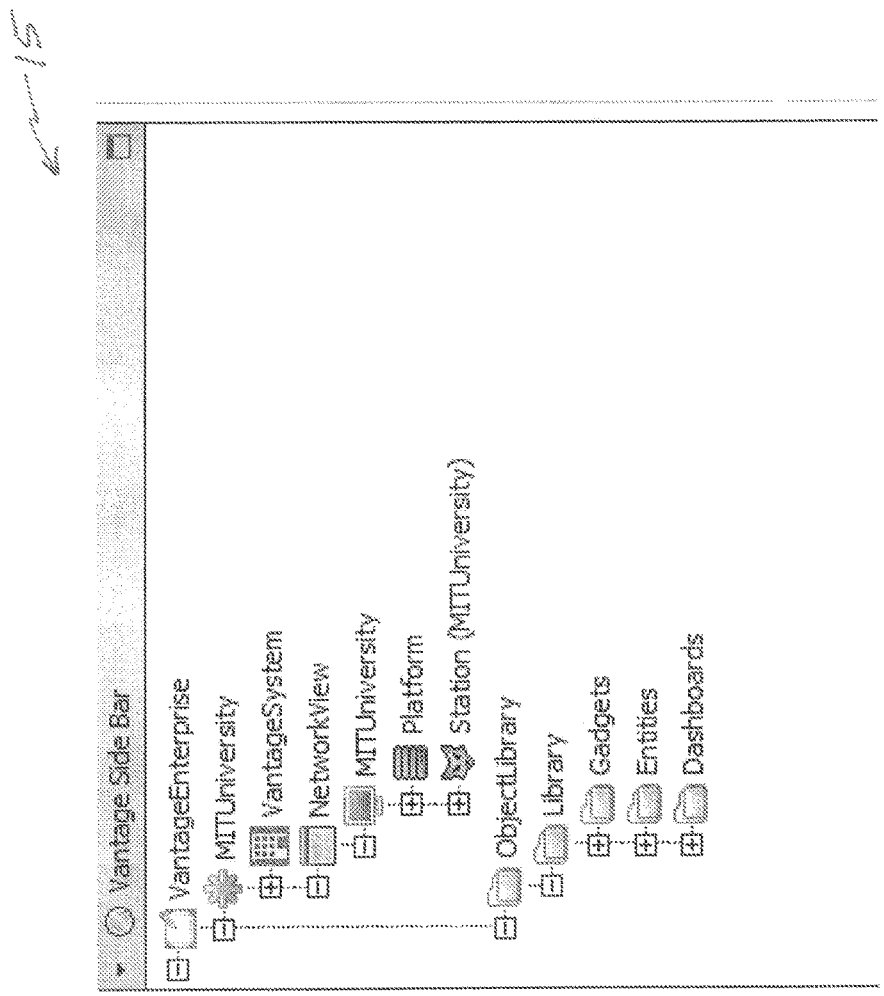
FIG. 5 is a diagram of a screen that shows the enterprise side bar showing a listing of a new job.
Figure 6:
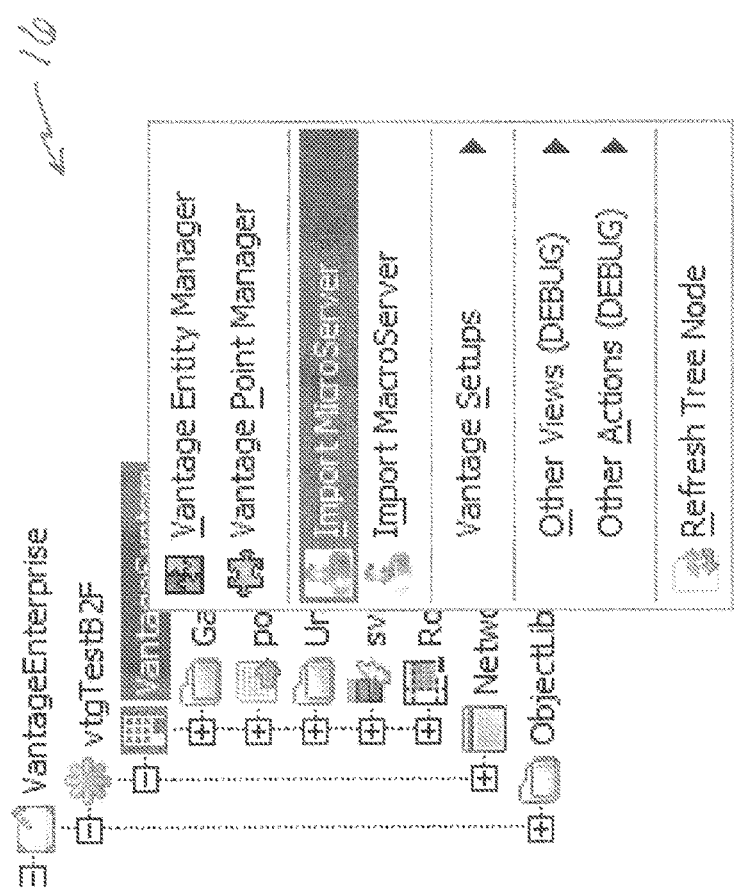
FIG. 6 is a diagram showing an import of a macroserver/microserver.

FIG. 4 is a diagram of a screen 14 that shows a new job having been created. FIG. 5 is a diagram of a screen 15 that shows the Vantage side bar showing a listing of a new MIT job. For an import of a macroserver/microserver, screens 14 and 15 may be launched from a dropdown menu for Vantage system as shown by a screen 16 in a diagram of FIG. 6.

Figure 7:
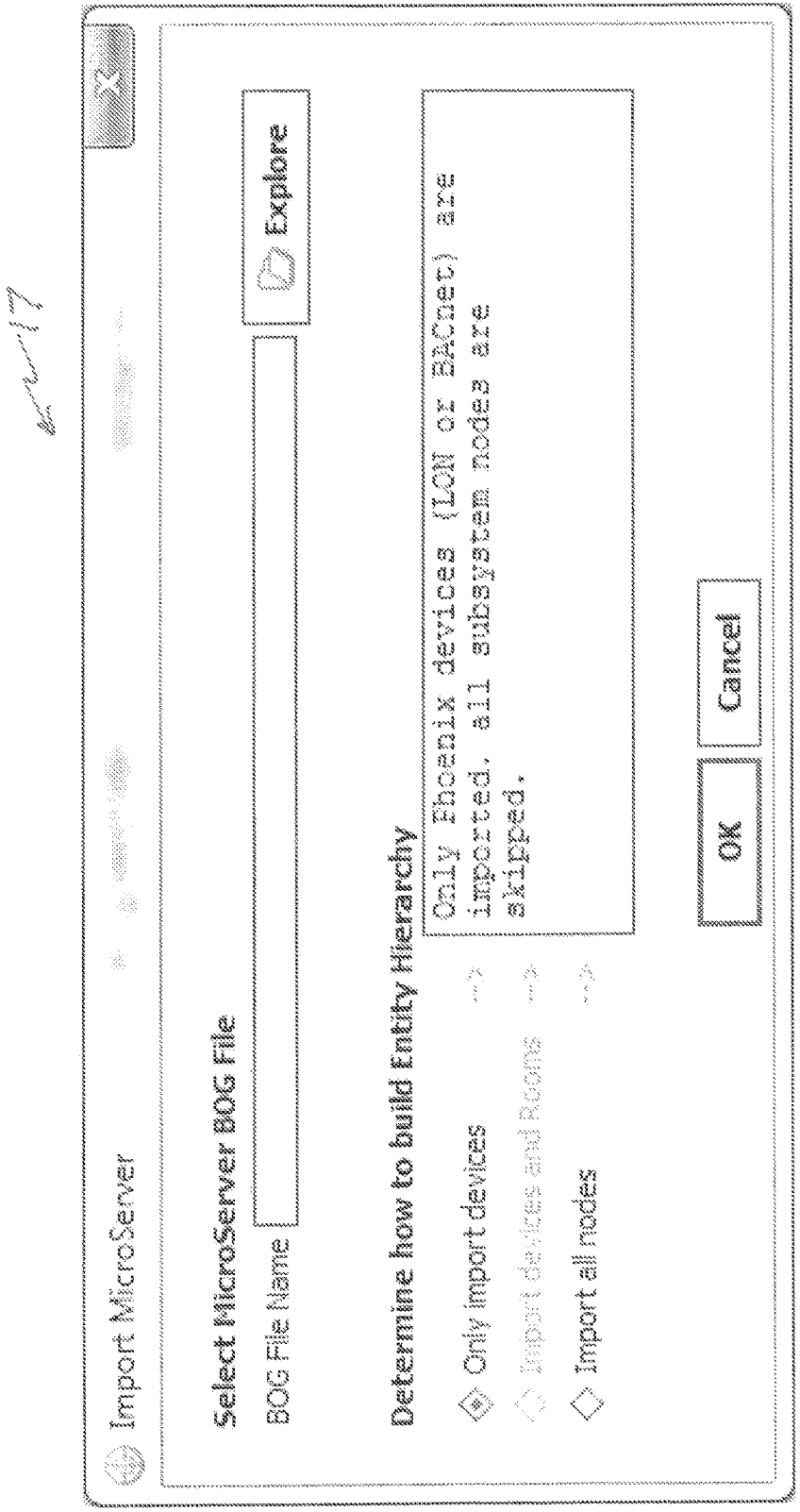
FIG. 7 is a diagram of an import microserver popup screen.

FIG. 7 is a diagram of an import microserver popup screen 17. The graphical user interface (GUI) elements of a convert analog dialog box may be shown by a table 18 in a diagram of FIG. 8.

Figure 9:
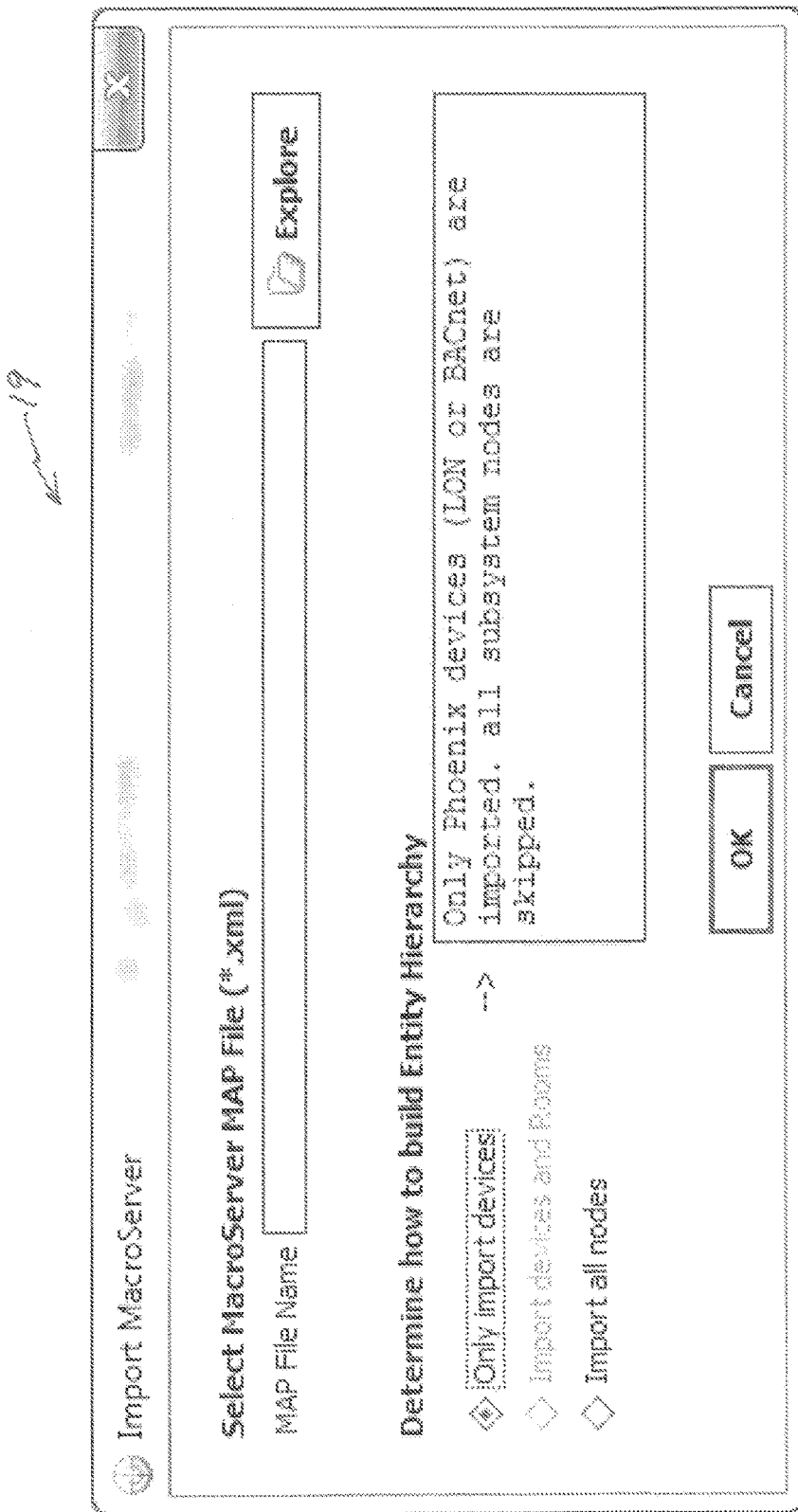
FIG. 9 is a diagram of an import macroserver popup screen.

FIG. 9 is a diagram of an import macroserver popup screen 19.

An expected output of an importing microserver may be noted. A successful importing microserver command may make the following changes to the existing Vantage station.

A single BACnet device may be created. A naming convention may incorporate an SRV200_[Device Instance Number], e.g., "SRV200_20301". Virtually all BACnet points contained in BOG files may be added to a station. A point name convention may be VFPT_[Point Instance Number], e.g., "AI_FLOW_HOOD_10154". A VFPT may be a Vantage functional point. Unit facets of BACnet points may be normalized based on job preferences. A history extension and a baseline extension may be added and configured based on job preferences. A single OM hierarchy may be created under the Vantage system. A name of the top node may be the same as that of the BACnet device (e.g., e:SRV200_20301). Point tables of device entities may be populated.

There may be an expected output of an importing microserver. A successful importing microserver command may make the following changes to the existing Vantage station. Virtually all BACnet devices may be added to a BACnet network. The naming convention may be [Device Model] [Device Instance Number], e.g., "LVC_Hood_20".

Figure 10:
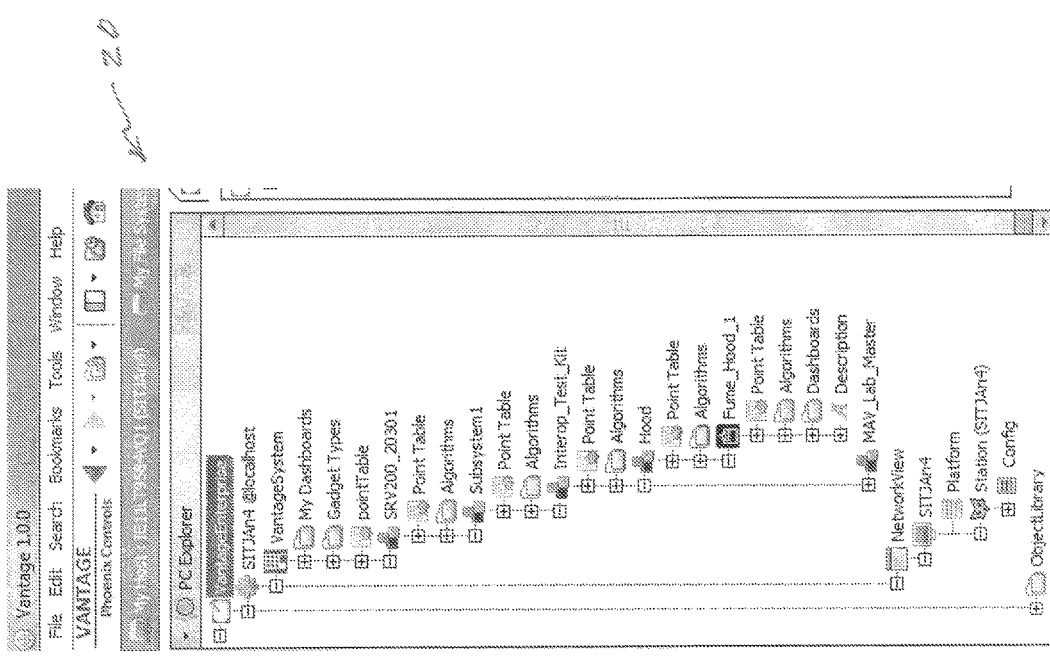
FIG. 10 is a diagram of a screen showing a logical hierarchy of entities created after an importing from a micro/macro server.

FIG. 10 is a diagram of a screen 20 showing a logical hierarchy of entities created after an importing from a micro/macro server.

Figure 11:
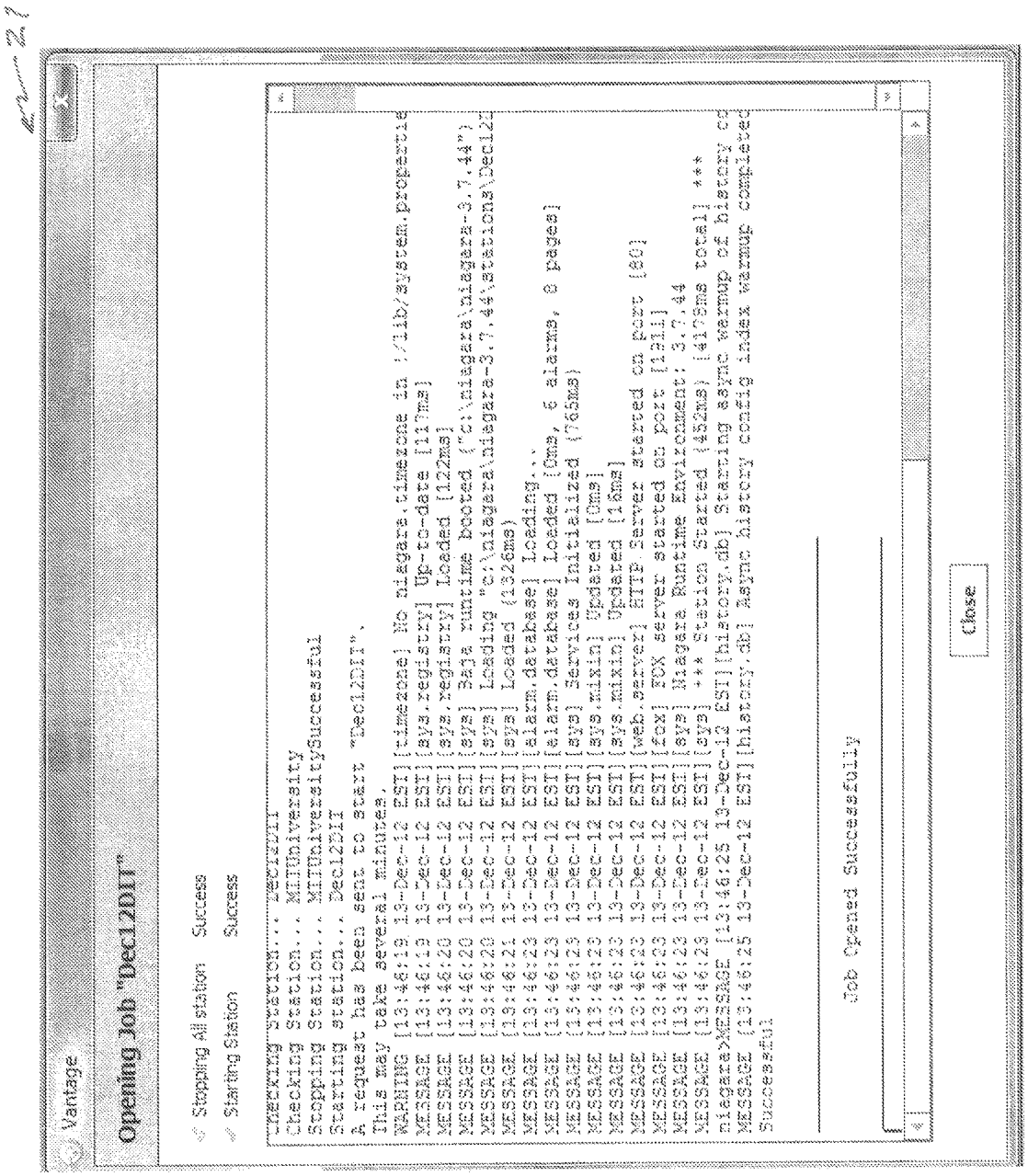
FIG. 11 is a diagram of a sequence leading to opening a job successfully.

FIG. 11 is a diagram of a sequence leading to opening a job successfully. A local job may be opened. A PC technician may open an already existing job by invoking open local job. The local job may be opened from the local job folder under a Vantage folder inside a Niagara home. A Vantage portal may get opened within the Vantage enterprise node which would be establishing a connection to the local job station. A physical view and network node may also get opened up to show the physical and network views accordingly. The physical view may start with the Vantage system and corresponding object model; a network view may have the Vantage station.

Figure 12:
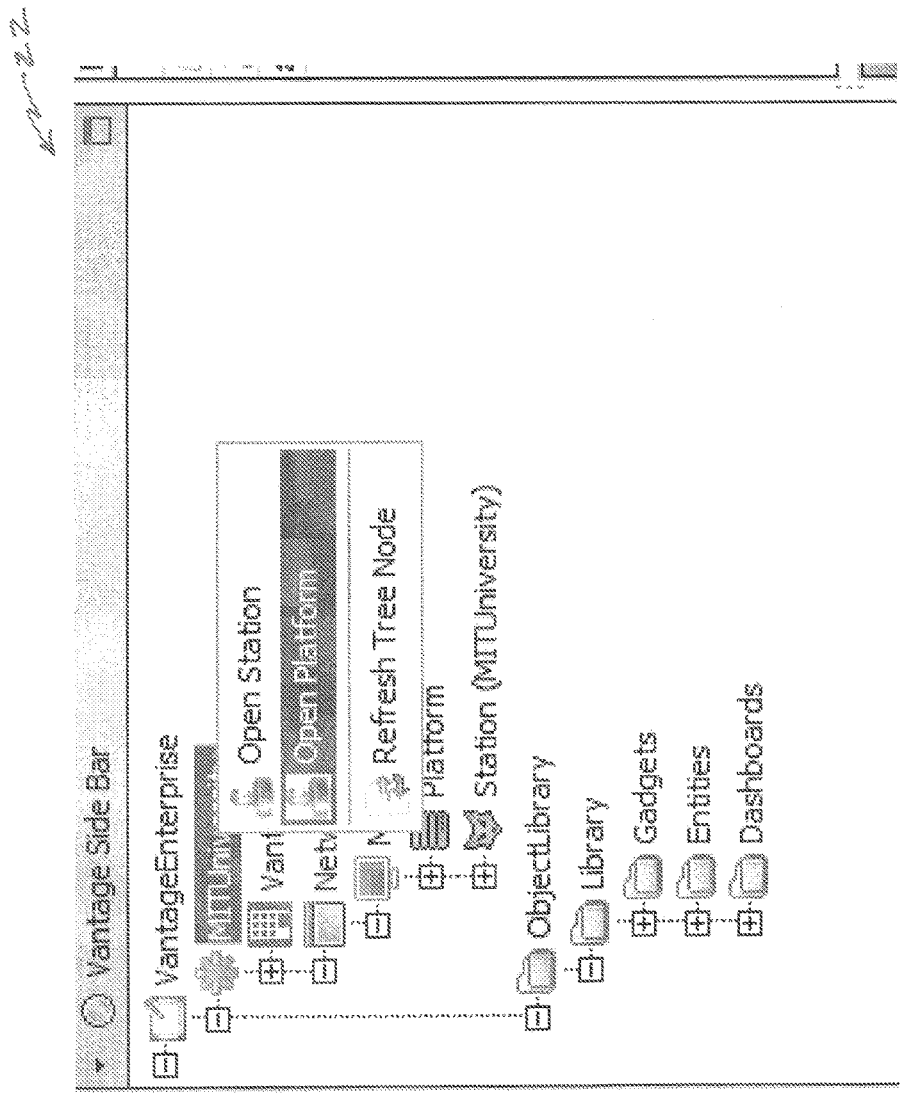
FIG. 12 is a diagram of a local station or platform to which a user may connect.

The user may connect to a local station or platform as shown in a screen 22 of a diagram in FIG. 12.

A PC technician may connect to a remote job by giving the job name and internet protocol (IP) address of a VTM700. A skeletal remote job may be created in the remote job folder under a Vantage folder inside a Niagara home. A Vantage portal may get created within the Vantage enterprise node which would be establishing a connection to the remote job station. A physical view and network node also may get opened up to show the physical and network views accordingly. The physical view may be starting with the Vantage system and corresponding object model. A network view may have the Vantage station. It may currently support just a Fox port 1911.

Figure 13:
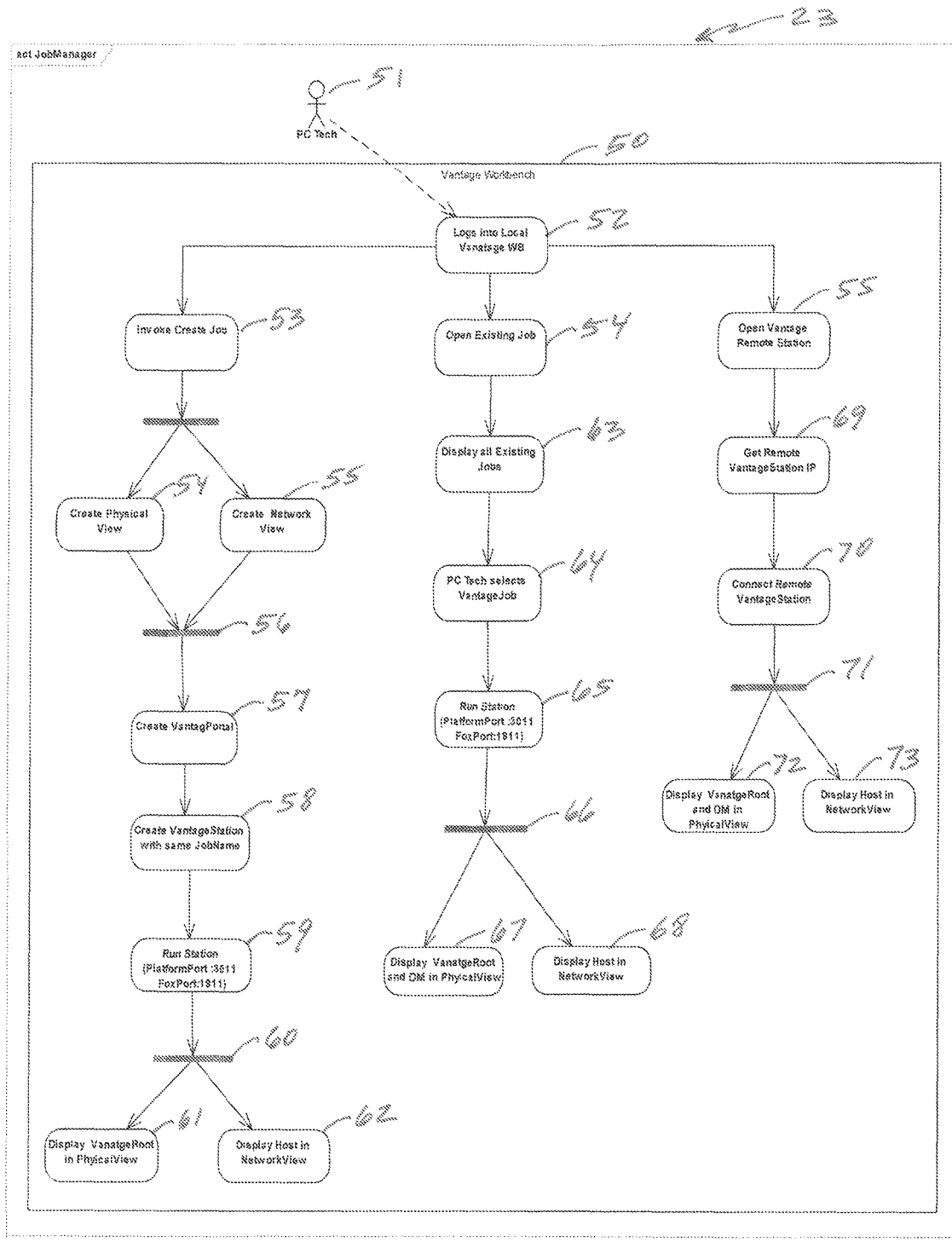
FIG. 13 is a diagram of the various paths for creating or opening a job or opening a enterprise remote station in a workbench.

FIG. 13 is a diagram 23 of the various paths for creating or opening a job or opening a Vantage remote station in the Vantage workbench. In diagram 23, a technician 51 may log into a local Vantage workbench 50 at step 52. Several approaches may incorporate invoking a create job at a step 53, open an existing job at a step 54 and open a Vantage remote station at a step 55.

From step 53, one may create a physical view at a step 54 and a network view at a step 55. The views may come together at a point 56 and a Vantage portal may be created at a step 57. A Vantage station with a same job name may be created at a step 58. A station may be run at a step 59. At a point 60, an outcome of step 59 may be split into displaying a Vantage root in a physical view at a step 61 and displaying a host in a network view at step 62.

From step 54, one may display virtually all existing jobs at a step 63. One may select a Vantage job at a step 64. A station may be run at a step 65. At point 66, an outcome of step 65 may be split into displaying a Vantage root and an object model in a physical view at a step 67 and displaying a host in a network view at a step 68.

From step 55, one may get a remote Vantage station IP at a step 69. A remote Vantage station may be connected at a step 70. An outcome from step 70 may split at point 71 into displaying a Vantage root and object model in a physical view at a step 72 and displaying a host in a network view at a step 73.

Figure 14:
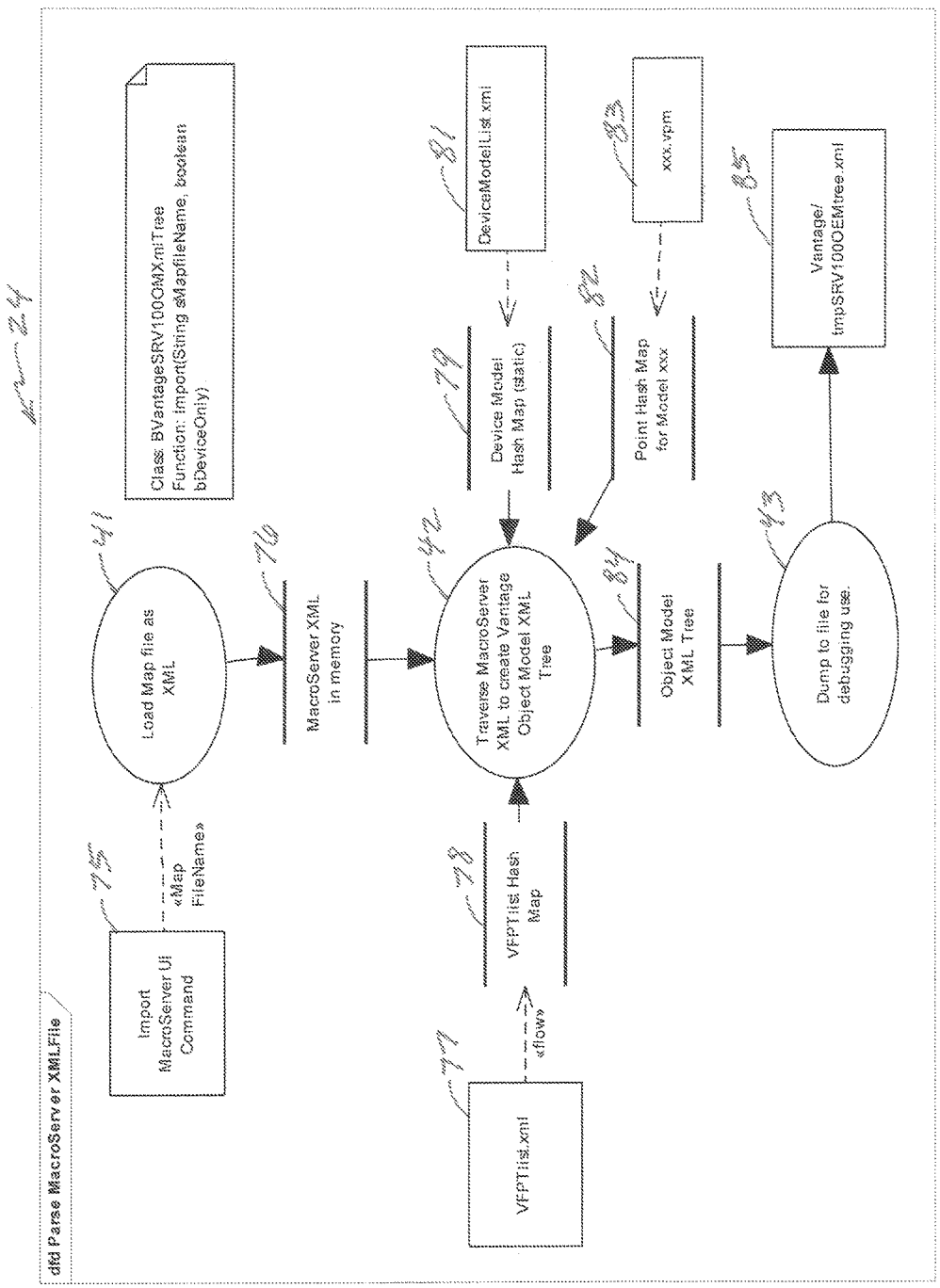
FIG. 14 is a diagram noting an import macroserver file and a data flow diagram, followed by a description of the individual processing function blocks.

An import macroserver XML file may be noted. A data flow diagram 24 is shown in FIG. 14, followed by the description of the individual processing function blocks. A map file may be loaded as an XML file at step 41. As to processing, a standard Niagara XML tool may be used to read in the XML. As to error handling, one may assume a file is in a macroserver format. An exception may occur if the file does not conform to a macroserver map file format. A traverse macroserver XML may be used to a create Vantage object model XML tree at step 42, which may be dumped to a file at step 43 for debugging use.

Additional items may be noted in FIG. 14. Map file names may go from an import macroserver user interface command 75 to branch 41. A macroserver XML 76 in a memory may go from branch 41 to branch 42. From VFPT list 77, a VFPT list hash map 78 may go to branch 42. A device model hash map (static) 79 may go from device model list 81 to branch 42. A point hash map for a model xxx 82 may go from xxx.vpm to branch 42. An object model XML tree 84 may go to branch 43. An output from branch 43 may go to Vantage/tmpSRV100OEM tree 85.

As to data, one may note a data structure of an object XML structure in a diagram 25 of FIG. 15. For processing, the following items may be noted. For each found device in macroserver XML tree, one may find the matching model name (e.g., LvcSBRC) in a device model hash map (i.e., a static member of the class BVantageOMXmlTree). The location string of device elements may be parsed to create an entity tree. A location string example may incorporate "FieldServerTes.Subsystem 1. Theris Patient Room (TP): There may be a patient room (TP LVC-1)". The model name may be used to load the point map file of the same name (LvcSBRC.vpm). One may traverse the device's point list in macroserver XML tree. For each point, one may find the VFPT in a point hash map based on a point type and instance number. The point element may be added to the OMXml tree. For error handling, a missed point or unmapped point may be skipped in case point maps may not yet be necessarily fully developed.

A process of an importing microserver may be similar to that of the macroserver.

Figure 16:
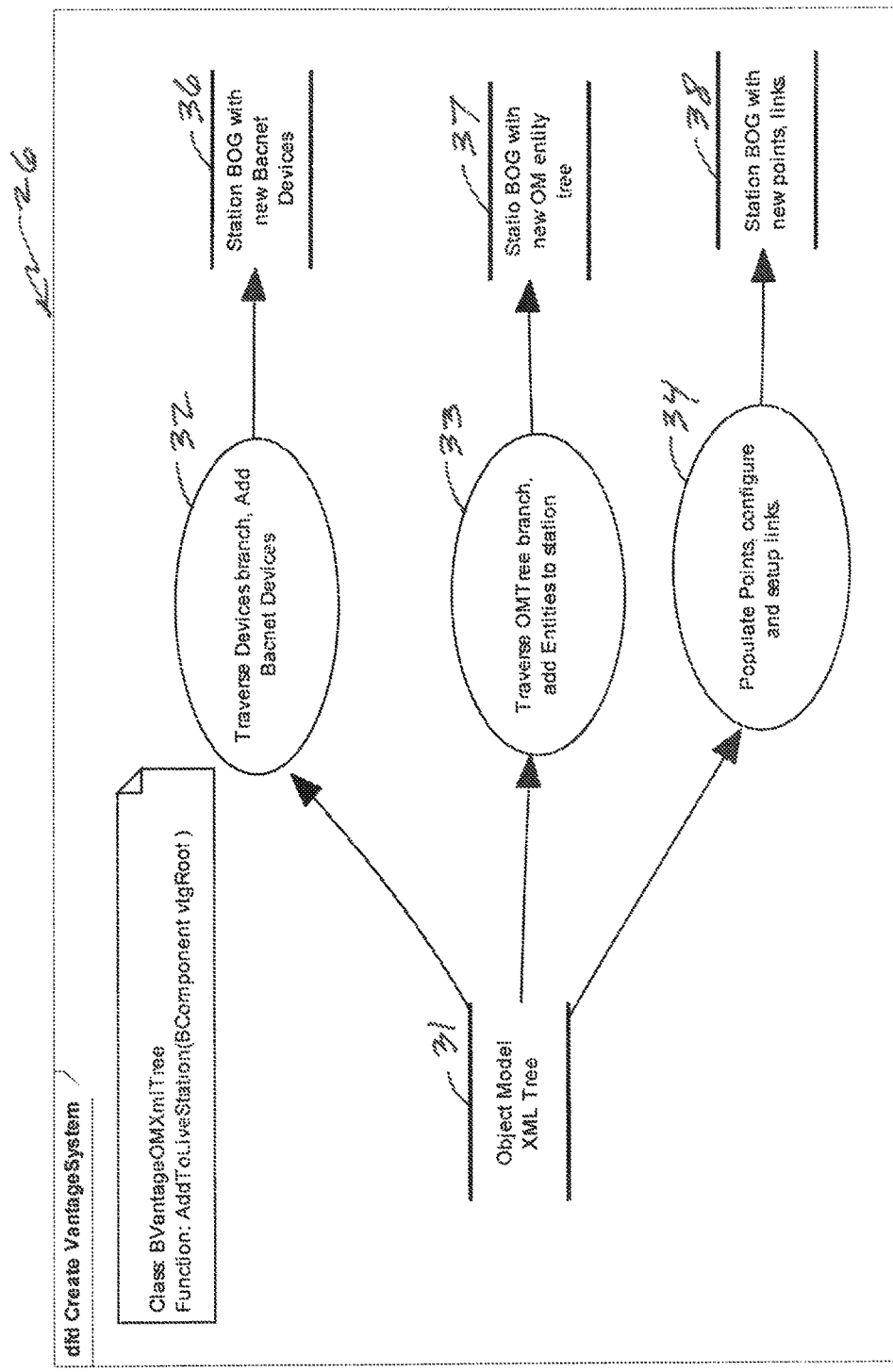
FIG. 16 is a data flow diagram for creating an enterprise system followed by a description of the individual processing function blocks.

A data flow diagram for creating a Vantage system is shown in a diagram 26 of FIG. 16, followed by a description of the individual processing function blocks. First, one may traverse a device branch 32 of an object model XML tree 31. As for processing, one may go through the flat device list of a device element. For each device element, one may add a BACnet device with name set as [Model Name]_[Device Instance Number], and set up a device instance number.

As to error handling, a device is not necessarily listed in DeviceModelList.xml file, meaning it is not necessarily a recognized and supported device for importing wizard. This device may be imported as generic type.

One may populate points, configure and setup links at branch 34.

As to processing, at branch 33, one may traverse the point list of each device in an OM (object model) tree, for each point element, add a Bcontrol point of proper type (numeric, Boolean, and so forth) to the BACnet device, setup a history extension and baseline extension, and normalize a unit based on job preferences. An outcome of branch 32 may be a station BOG 36 with new BACnet devices. An outcome of branch 33 may be a station BOG 37 with a new OM entity tree. An outcome of branch 34 may be a station BOG 38 with new points and links.

As to error handling, if a device is not listed in DeviceModelList.xml file, importing wizard cannot necessarily create a VFPT for its points. A point's object name may be copied into VFPT field. As to a result, if no existing point template can be found, the generic point template (AI, AO, BI, BO, MSI, MSO) may be used instead.

The map files listed in a table 27 of FIG. 17 may be needed. These files may be located in a Vantage folder of a local host station.

To recap, an approach for managing a job may incorporate providing a computer, logging into a local enterprise workbench with the computer, selecting an approach from a group consisting of creating a new job, opening an existing job, and connecting to a remote job. The job may be a providing a logical model of one or more buildings or structures as a configuration for deployment to one or more site controllers. Creating a job may incorporate creating a physical view and a network view. Opening an existing job may incorporate displaying virtually all existing jobs. Connecting to a remote job may incorporate getting a remote job station IP address.

Creating a job may further incorporate creating an enterprise portal, creating an enterprise station having a job name, running the station having a port, displaying an enterprise root in a physical view, and displaying a host in a network view.

The station may incorporate configurations that support the workbench, a dashboard and gadgets. The portal may be for a connection to the station. The network view may have the station. The physical view may have an object model.

Opening an existing job may further incorporate selecting a job from the virtually all existing jobs, running a station having one or more communication ports, displaying an enterprise root and object model in a physical view, and displaying a host in a network view.

The station may incorporate configurations that support the workbench, a dashboard and gadgets. The portal may be for a connection to the station. The network view may have the station. The physical view may have an object model.

Opening a remote job, may further incorporate connecting to the remote job station, displaying an enterprise root and an object model in a physical view, and displaying a host in a network view.

The station may incorporate configurations that support the workbench, a dashboard and gadgets. The portal may be for a connection to the station. The network view may have the station. The physical view may have an object model. An approach for parsing a macroserver file may incorporate providing a computer, importing a macroserver in a first file format from a source via a user interface command on the computer, loading the macroserver file in a second file format file into a memory, bringing in a function point list hash map, a device model list hash map and a point hash map for a selected model to the memory, and traversing the macroserver file in the second file format in view of the functional point list hash map, the device model list hash map and the point hash map for the selected model, to create an object model tree in the second file format.

The approach may further incorporate dumping the object model tree in the second file format to a file for debugging use.

The first file format may be a MAP and the second file format may be an XML.

The approach may further incorporate for each found device in the macroserver tree in the second file format, finding a matching model name in the device model hash map, parsing a location string of a device element to create an entity tree, and using a model name to load a point map file of a like name.

The approach may further incorporate traversing a point list of a device in the macroserver tree in the second file format, finding for each point of the point map file a functional point in the point hash map and an instance number, and adding the functional point to the object model tree in the second file format.

An approach for creating an enterprise system may incorporate providing a computer, providing an object model tree in a first file format, having a branch of devices and a branch of object models on the computer, obtaining a list of devices on the branch of devices, adding a BACnet device for each device of the list of devices, obtaining a point list of each device, and for each point of the point list of each device, adding a control point to each BACnet device.

Each added BACnet device may have a name set with a model name and a device instance number.

The approach may further incorporate adding one or more entities to the branch of object models.

A station in a second file format may incorporate each BACnet device added relative to the branch of devices.

A station in a second file format may incorporate each control point added to a BACnet device.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method for configuring a site controller, comprises:
    logging into a local enterprise workbench with a computer, existing jobs are accessible through the local enterprise workbench and new jobs are created and deployed through the local enterprise workbench;
    creating a new job for a site controller using the computer and the local enterprise workbench; and
    configuring the site controller, the configuring the site controller includes deploying the created new job to the site controller via the local enterprise workbench; and
    wherein:
    the created new job that is deployed to the site controller provides a logical model of one or more buildings or structures that is used by the site controller as part of a configuration;
    the creating the new job and the configuring the site controller comprise:
    stopping all running job stations associated with the site controller;
    creating a physical view and a network view;
    creating an enterprise portal between the local enterprise workbench and the site controller;
    creating a job station in the local enterprise workbench for the site controller;
    connecting to the site controller through the created job station via the enterprise portal;
    running the job station via the enterprise portal to run the deployed job at the site controller;
    in response to running the job station, displaying in the physical view an object model and an enterprise root used to create the new job; and
    in response to running the job station, displaying the job station and a host in the network view.

2. The method of claim 1, wherein the job station comprises configurations that support the workbench, a dashboard and gadgets.

3. The method of claim 1, further comprising:
    opening an existing job using the computer, wherein opening the existing job comprises:
    selecting a job from the existing jobs;
    running an existing job station having one or more communication ports;
    displaying an enterprise root and object model in a physical view for the existing job; and
    displaying a host in a network view for the existing job.

4. The method of claim 3, wherein the existing job station comprises configurations that support the workbench, a dashboard and gadgets.

5. The method of claim 3, wherein:
    the communication ports are for connecting to the existing job station;
    the network view has the existing job station; and
    the physical view has an object model for the existing job station.

6. The method of claim 1, further comprising:
    opening a remote job using the computer, wherein opening the remote job comprises:
    connecting to a remote job station having one or more communication ports;
    displaying an enterprise root and an object model in a physical view for the remote job; and
    displaying a host in a network view for the remote job.

7. The method of claim 6, wherein the remote job station comprises configurations that support the workbench, a dashboard and gadgets.

8. The method of claim 6, wherein:
    the communication ports are for a connection to the remote job station;
    the network view has the remote job station; and
    the physical view has an object model for the remote job station.

* * * * *